United States Patent
Carbonare et al.

[11] Patent Number: 6,138,960
[45] Date of Patent: Oct. 31, 2000

[54] PIPE CLAMP WITH U-SHAPED STIRRUP

[75] Inventors: Martin Carbonare, Koblach, Austria; Rainer Loose, Marktoberdorf; Jakob Dischinger, Eismerszell, both of Germany

[73] Assignee: Hilti Aktiengesellschaft, Schann, Liechtenstein

[21] Appl. No.: 09/343,852

[22] Filed: Jun. 30, 1999

[30] Foreign Application Priority Data

Mar. 8, 1999 [DE] Germany ................. 299 04 088 U

[51] Int. Cl.⁷ .................................................. E21F 17/02
[52] U.S. Cl. .................................................. 248/62
[58] Field of Search ............................ 248/62, 58, 59, 248/63, 64, 55

[56] References Cited

U.S. PATENT DOCUMENTS

| | | | |
|---|---|---|---|
| 2,394,263 | 2/1946 | Reintjes | 248/58 |
| 2,466,247 | 4/1949 | Land | 248/62 |
| 3,167,286 | 1/1965 | Sherburne | 248/62 |
| 3,323,766 | 6/1967 | Schauster | 248/62 |
| 4,039,131 | 8/1977 | Perrault et al. | 248/903 X |
| 5,219,427 | 6/1993 | Harris | 248/59 |
| 5,577,695 | 11/1996 | Ruckwardt | 248/903 X |
| 5,924,655 | 7/1999 | Rindrer | 248/55 |

*Primary Examiner*—Ramon O. Ramirez
*Attorney, Agent, or Firm*—Brown & Wood, LLP

[57] ABSTRACT

A pipe clamp including a substantially U-shaped upper stirrup (2) having a base section (3), two substantially linear upper arms (4.5) projecting from the base section (3) and having their end portions extending substantially parallel to each other, and a stiffening member (19) extending from one upper arm (4) to another upper arm (5) and spanning a free cross-section of the pipe clamp (1) a substantially U-shaped lower stirrup (6) having a substantially circular shape, and two lower arms (8,9), and articulated connection element (10) for pivotally connecting one of the upper arms (5) of the upper stirrup (2) with one of the lower arm (9) of the lower stirrup (6), and a locking element (13) located opposite the articulated connection element (1) for releasably connecting another of the upper arms (4) of the upper stirrup (2) with another of the lower arms (8) of the lower stirrup (6).

10 Claims, 3 Drawing Sheets

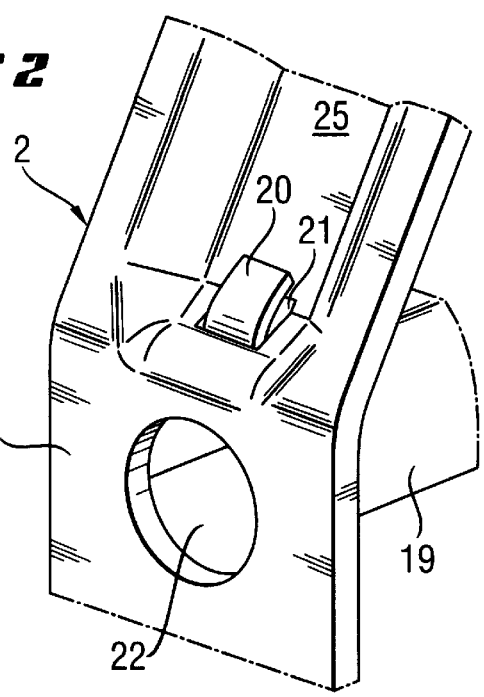
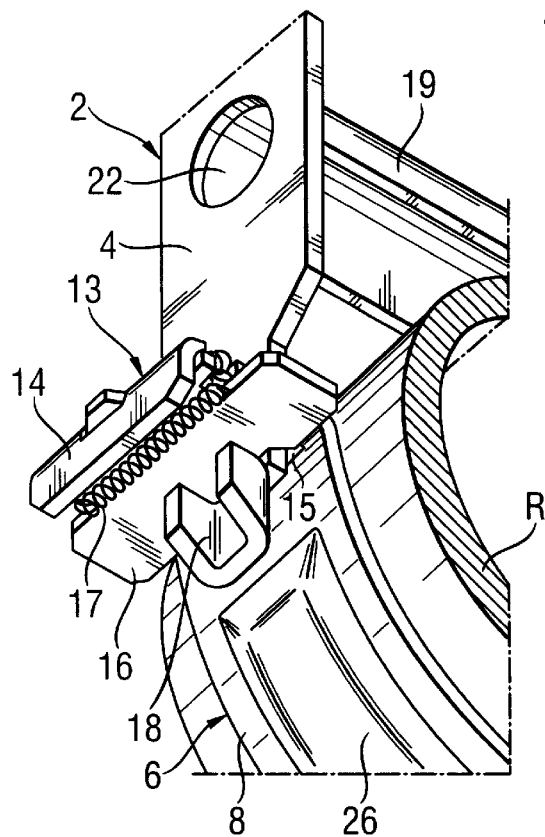
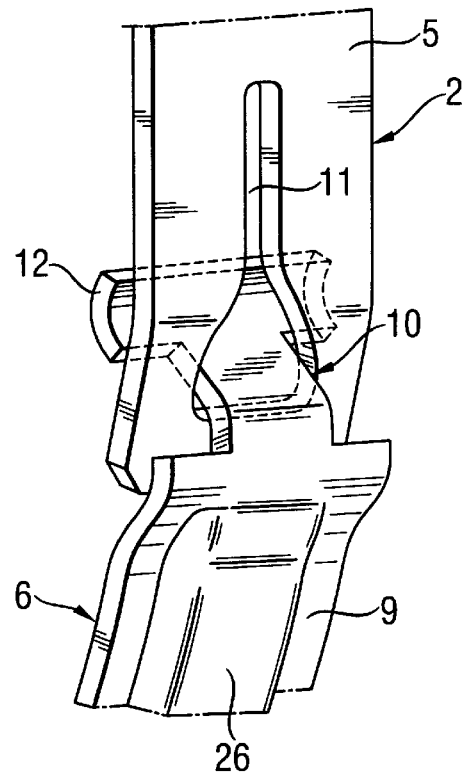

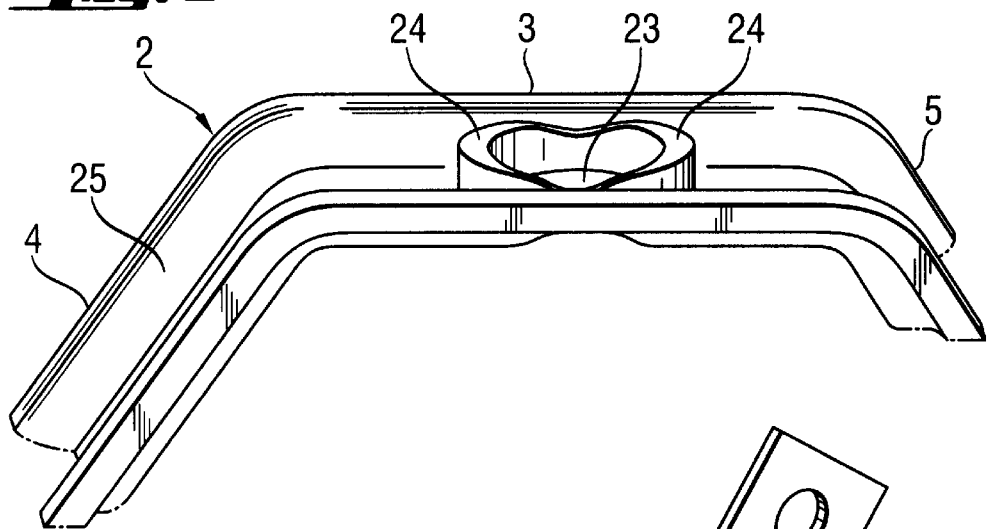
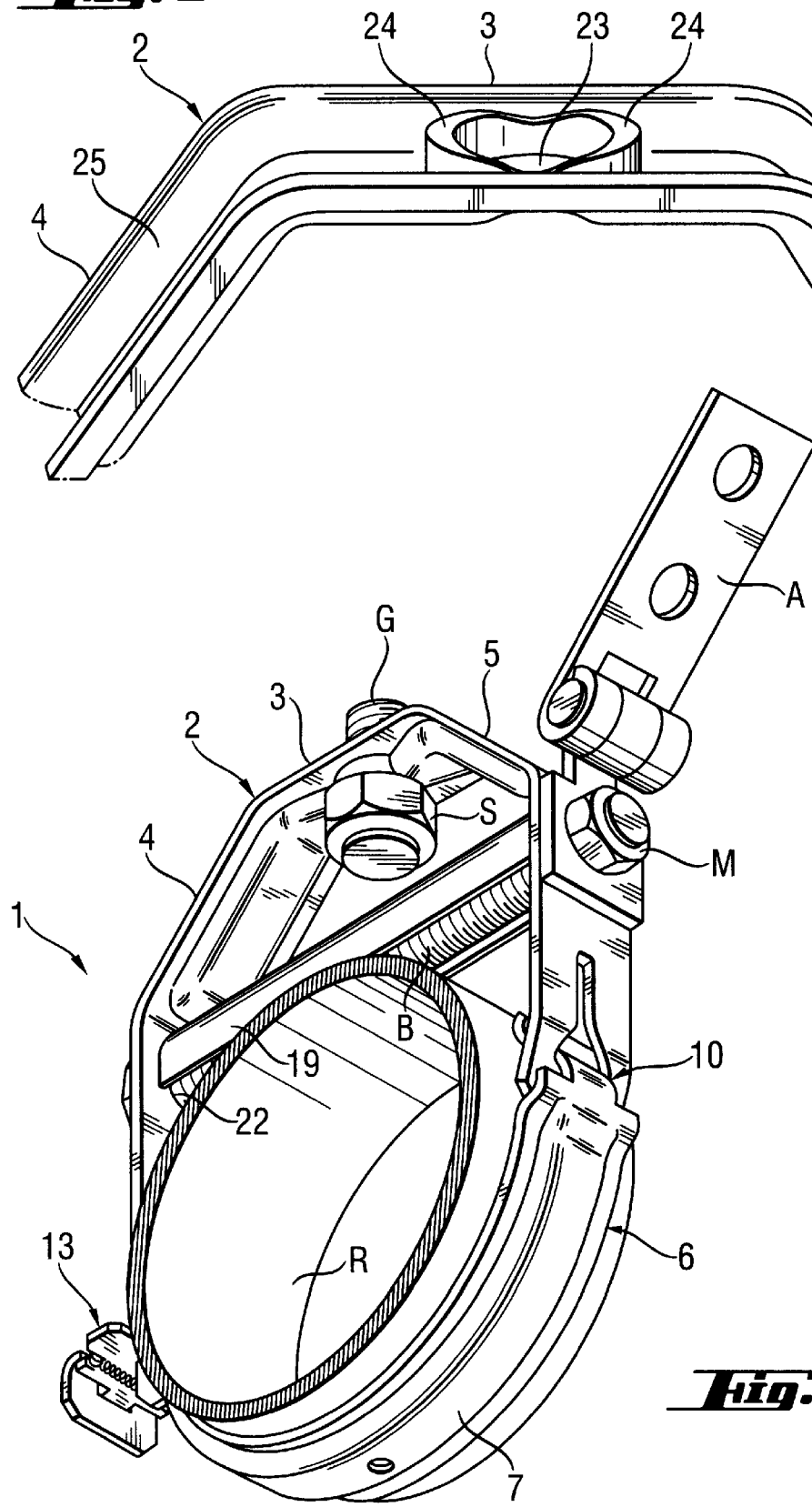

PIPE CLAMP WITH U-SHAPED STIRRUP

BACKGROUND OF THE INVENTION

1. Field of the Invention

The present invention relates to a pipe clamp including a substantially U-shaped upper stirrup having a base section provided with attachment means for receiving a threaded rod, two substantially linear upper arms projecting from the base section and having their end portions extending substantially parallel to each other, and a substantially U-shaped lower stirrup having a substantially circular shape and two lower arms.

2. Description of the Prior Art

Pipe clamps of the type described above, as indicated, have two substantially U-shape stirrups which are releasably connected with each other. The upper U-shaped stirrup, as indicated, has two upper arms which project from a substantially linear base portion and which have their ends extending parallel to each other. The substantially linear base portion has a bore in which a threaded rod is received and from which the pipe clamp is suspended. The second, lower U-shaped stirrup serves for supporting a pipe received in the pipe clamp. The lower U-shaped stirrup has a substantially circular form and has two arms projecting from the circular section and which generally extend parallel to each other. In the known pipe clamps, the ends of the arms are provided with corresponding holes. For connecting the two stirrups, thread bolts extend through the holes formed in the ends of the arms of both upper and lower stirrups. As a thread bolt, primarily, a set bolt is used. By screwing a nut at the end of the bolt opposite from the bolt head, sliding of the bolt from the base is prevented. Instead of set bolts simple thread bolts can be used. Two nuts provided at opposite ends of a thread bolt ensure connection of two U-shaped stirrups with each other.

With conventional use, the known pipe clamp usually is suspended from a ceiling and the supported pipe is received in the lower stirrup. Because of this, the pipe clamp is subjected to a significant weight loading. The weight of the pipe can cause deformation of the pipe clamp in the vertical direction whereby the arms of the stirrups become inclined inward. As a result of the vertical deformation, the pipe clamp does not bear its portion of the weight of the pipe and adjacent pipe clamps can be subjected to excessive loads. The increase of the thickness of the wall of the stirrup adversely effects the characteristics of the known pipe clamp. The resulting increased weight of the pipe clamp aggravates handling of the clamp, making its handling more difficult. In addition, with the increased wall thickness, the manufacturing cost of the pipe clamp substantially increased.

Accordingly, an object of the present invention is to provide a pipe clamp which is simple in handling and is capable of carrying a predetermined load for a long period of time. Another object of the invention is to provide a pipe clamp which would be inexpensive in manufacturing.

SUMMARY OF THE INVENTION

These and other objects of the present invention, which will become apparent hereinafter, are achieved by providing a pipe clamp which has at least two substantially U-shaped stirrups releasably connected with each other. The upper U-shaped stirrup has two upper arms projecting from a substantially linear base portion which has attachment means for receiving a threaded rod. The end sections of the arms extends substantially parallel to each other. The second lower U-shaped stirrup has a substantially circular shape and two arms projecting from the circular section. The releasable connection of the upper and lower stirrups includes an articulated connection of respective upper and lower arms. The other pair of respective upper and lower arms is connected by locking means. The upper stirrup is provided with a stiffening member extending from one upper arm to another upper arm.

The articulated connection and appropriate locking means ensure an easy handling of the inventive pipe clamp. The articulated connection permits to provide for a simple pivotal movement of the lower stirrup relative to the upper stirrup, with the two stirrups remaining connected with each other all the time. In the folded up position of the lower stirrup, the locking means provides a connection of both stirrups capable of withstanding a predetermined load. The stiffening member prevents deformation of the pipe clamp by the loads applied thereto. The stiffening member extends over the free cross-sections of the pipe clamp and maintains the distance between two upper arms constant. Further, the stiffening member permits to make the wall thickness smaller with the same loading capability of the stirrups which is advantageous in production of the pipe clamp. Because of the smaller thickness of the stirrup walls, the weight of the pipe clamp is smaller, which facilitates handling of the pipe clamp. The stiffening member can generally be of any shape. Advantageously, however, a U-shape, V-shape, or circular shape of the stiffening member is preferred.

The stiffening member can be formed as a removable member. Advantageously, however, the stiffening member is permanently connected with both arms of the upper stirrup. Thereby an unintentional or accidental deformation of the pipe clamp is prevented.

The connection of the stiffening member with the upper arms can be effected, for example, by welding. From the manufacturing point of view, it is advantageous, however, to provide a form-locking connection of the stiffening member with the upper arms. When a form-locking connection is used, the free ends of the stiffening member are provided with projecting tongues which extend through the respective openings formed in the upper arms and are bent upward.

Providing openings in the upper arms in the area of their connection with the stiffening member permits to increase the field of application of the pipe clamp according to the present invention. The openings in the stiffening area of the pipe clamp can be used for insertion of braces which, for example, may be necessary in areas where the risk of earthquakes exists. To this end, for example, a thread bolt is extended through the openings with a special bracing element being connected to the bolt. For reducing the space occupied by the pipe clamp, it is advantageous when the stiffening member has a U-shaped cross-section, with the U-section facing the lower stirrup. With a suitable arrangement of the through-openings in the upper arm, the thread bolt is extended inside of the U-shaped stiffening member.

In accordance with an advantageous embodiment of the present invention, the locking means comprises a hook-shaped projection provided in one of the arms and a through-opening in a radially projecting flange formed at the end of another arm. The through-opening is partially closed by a cover plate which is pivoted out against a biasing force to open the opening. In the locking condition, the hook-shaped projection engages the cover plate from beneath. The cover plate is provided at the end of the flange remote from the projection. When the projection extends into the flange opening, the cover plate is automatically pivoted out by the front end of the hook-shaped projection and engages the hook-shaped region of the projection. Thereby, the projection can not slide out any more from the opening of the flange. For example, the hook-shaped projection can be provided on the upper stirrup and the flange with the through-opening can be provided in the lower stirrup. For fire safety purposes, it is advantageous to form the cover plate biasing spring as a metal spring, preferably, from stainless steel.

In a simply manufactured embodiment of the present invention, the articulated connection includes a corresponding locking tongue provided on one of the arms and a lock hole provided in another of the corresponding arms. Preferably, the lock hole is provided in that stirrup, the other end of which is provided with a hook-shaped projection. The corresponding locking tongue is provided on the arm, the end of which is provided with a through-opening. The lock hole and the corresponding locking tongue are so formed that the stirrups are released by pivoting one stirrup relative to another.

By selecting suitable dimensions of the arms in the region of their articulated connection and their locking connection, pivoting of the stirrups relative to each other can be controlled. Preferably, the size of the opening in the radially projecting flange or the size of the lock hole and the width of the hook-shaped projection of the locking connection or of the locking tongue of the articulated connection are so selected that in the locking condition, the stirrups are inclined in the axial direction by an angle of about 15°. Thereby, the flexibility of the pipe clamp is retained and, on the other side, the erroneous positioning of the stirrup, which may result from wedging of the pipe, is prevented.

The stiffening of the pipe clamp is also improved by providing the upper and lower stirrups, at least along a portion of their extent, with reinforcing fins. Providing the reinforcing fins in the stirrups permits to reduce the wall thickness of the stirrups with the same loading cap ability. This advantageously influences the manufacturability of the pipe clamp and reduces the weight of the clamp.

DETAILED DESCRIPTION OF THE DRAWINGS

The objects and features of the present invention will become more apparent, and the invention itself will be best understood from the following detailed description of the present invention when read with reference to the accompanying drawing; wherein:

FIG. 2 shows a detail of the pipe clamp shown in FIG. 1;

FIG. 3 shows a detailed view of the locking connection means of pipe clamp according to the present invention;

FIG. 4 shows a detailed view of the articulated connection means according to the present invention.

FIG. 5 shows a detailed view of the section of the pipe clamp provided with the attachment means, and FIG. 6 shows a prospective view of another embodiment of the pipe clamp according to the present invention with the pipe received therein.

DETAILED DESCRIPTION OF THE PREFERRED EMBODIMENT

Figure 1:
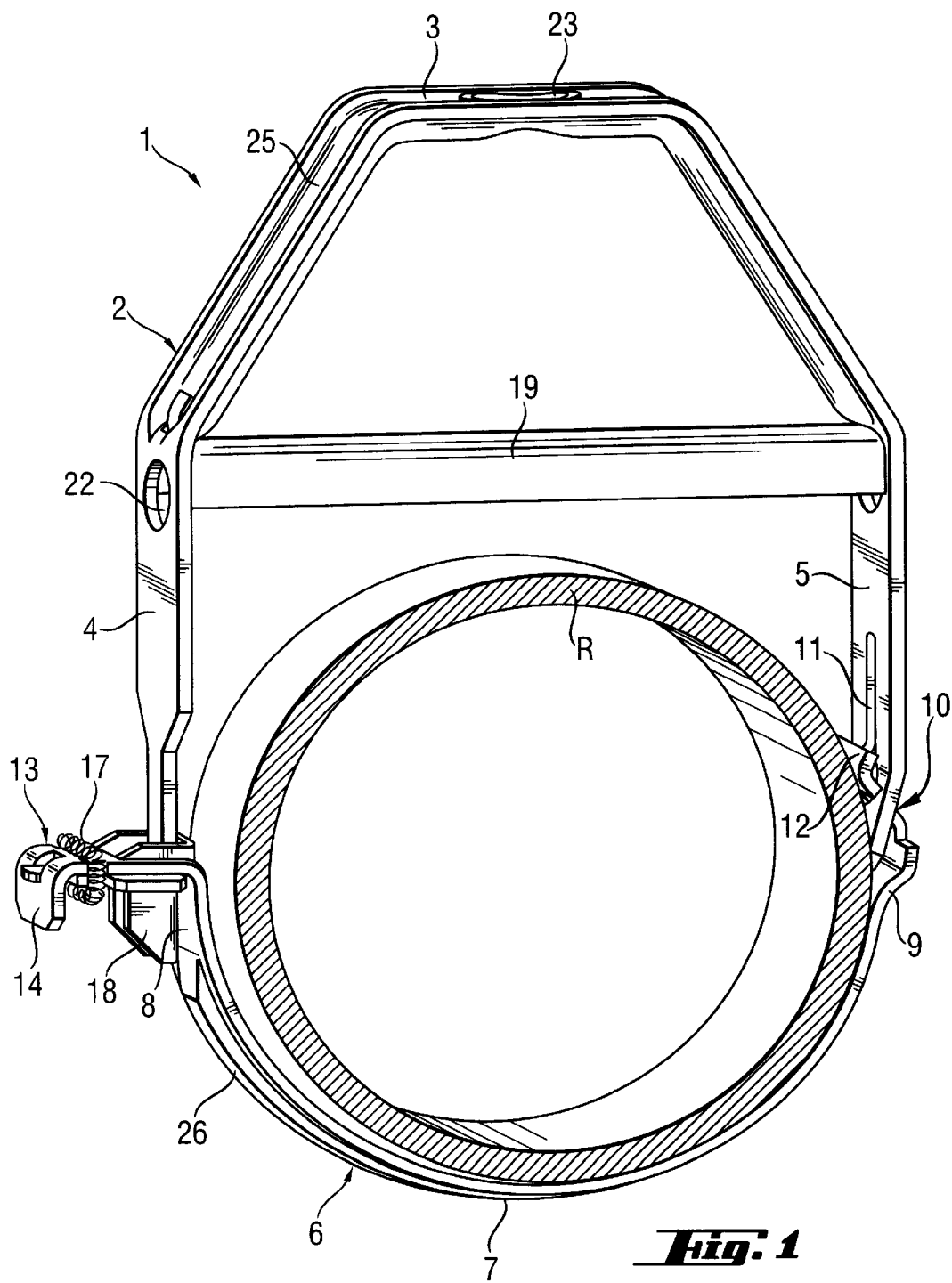
FIG. 1 shows a perspective view of a pipe clamp according to the present invention.

The pipe clamp according to the present invention, which is shown in FIG. 1, is generally designated with reference numeral 1. The pipe clamp 1 has substantially U-shaped upper and lower stirrups, 2, 6, which are releasably connected with each other. The upper U-shaped stirrup 2 has a substantially flat linear base section 3 from which two upper arm 4 and 5 project. The end sections of the upper arms 4 and 5 extend substantially parallel to each other. The lower stirrup 6 has a circular section 7 from which two arms, 8 and 9, project. A pipe which is supported in the pipe clamp is designated with a letter R and is supported by the circular section 7 of the lower stirrup 6. For increasing the stiffness, both stirrups 2 and 6 are provided at least partially along their extent with reinforcing fins 25 and 26. In the base section 3 of the upper stirrup 2, there is provided attachment means 23 which, according to the embodiment shown in the drawing, is formed as a bore through which a thread rod can extend. The releasable connection of the upper and lower stirrups to 2 and 6 includes an articulated connection 10 of one of upper and one lower arms 5 and 9 and a locking connection 13 on the opposite arms 4 and 8 of the upper and lower stirrups 2 and 6.

For increasing the stiffness of the pipe clamp 1, both upper arms 4 and 5 of the upper stirrup 2 are connected with a stiffening member 19. The stiffening member 19 extends over the free cross-sections of the pipe clamp 1 and prevents, during the loading of the pipe clamp by the weight of the pipe, the inclination of the two upper arms 4 and 5 towards each other and prevents deformation of the pipe clamp. The stiffening member 19 has, in the embodiment shown in the drawings, a U-shaped cross-section with the U-section facing the lower stirrup 6. The stiffening member 19 can also be formed as a clip-on member. According to the embodiment shown in the drawing, the stiffening member is permanently connected with upper arms 4 and 5 of the upper stirrup 2. Advantageously, the connection of the stiffening member 19 with the arms 4 and 5 is formed as a form a locking connection. To this end, a connection tongue projects from each of the free ends of the stiffening member 19. The tongues extend through the respective openings formed in the upper arms 4 and 5 of the upper stirrup 2 and are bent upwards. The detailed view shown in FIG. 2 illustrates a tongue 20 which projects from an end of the stiffening member 19. The tongue 20 extends through the opening 21 formed in the upper arm 4 and is bent upward, providing for form locking connection. FIG. 2 shows, in addition, an opening 22 provided in the upper arm 4 which is located adjacent to the form a locking connection of the stiffening member 19 with the arm 4. A similar opening is provided in the other upper arm 5. According to the embodiment shown in the drawing, the location of the through-openings are so selected that they are located sideways of the substantially U-shaped section of the stiffening member 19.

The locking connection 13 of the clamp 1 according to the present invention is shown in detail in FIG. 3.

The locking connection 13 includes a hook-shaped projection 1 8 which is formed as an extension of the upper arm 4. A flange 14 is formed on the lower arm 8 of the lower stirrup 6. The flange 14 projects somewhat radially outward. Through-opening 15 is provided in the flange 14. The hook-shaped projection 18 extends through the opening 15. On the side of the flange 14 remote from the arm 4, there is provided a cover plate 16 for covering a portion of the through-opening 15. The cover plate 16 is biased by a spring 17 which is supported on the flange 14 into its locking position. The cover plate 16 is pivoted out into an open position of the through-opening 15 against the biasing force of the spring 17. When the front end of the hook-shaped projection 18 is extended through the opening 15, the cover plate 16 is automatically pivoted out of its locking position and is engaged behind the hook-shaped region of the projection 18. Thereby the projection 18 cannot extend further into the through-opening 15 which is formed in the flange 14. For opening of the pipe clamp, the cover plate 16 is pivoted outwardly manually until the through-opening 15 becomes completely open and the projection 18 can be pulled out of the opening. Then, the cover plate 16 again pivots in its initial position under the biasing force of the spring 17. To increase fire resistance, advantageously, the spring 17 is formed of metal, preferably, from a stainless steel. The stiffening member is designated in FIG. 3 with a reference numeral 19. The pipe which is supported by the clamp is again designated with a letter R.

FIG. 4 shows an articulated connection 10 provided on the other complimentary arms 5 and 9. To this end, an opening forming a lock opening 11 is provided in the upper arm 5. The lower arm 9 is provided with a locking tongue 12. By pivoting the tongue 12 by about 90°, it can be displaced through the lock opening 11. By rotating the tongue 12 in the opposite direction, the locking is effected. In this position, the locking tongue 12 cannot be withdrawn from lock hole 11.

By selecting suitable dimensions of the arms 4, 5, 8 and 9 in the region of their articulated connection 10 and their locking connection 13, the tilting of the stirrups 2 and 6 relative to each other can be controlled. Advantageously, the size of the through-opening 15 in the radially projecting flange 14 and the size of the lock hole 11 and the width of the hook shaped projection 18 of the locking connection 15 or the size of the locking tongue 12 of the articulated connection 10 are so selected that in the locking condition, the stirrups 2 and 6 are tilted in the axial direction maximum by an angle of 15°. Thereby, the flexibility of the pipe clamp is retained, and error positioning of the stirrups is prevented.

FIG. 5 shows the base section 3 of the upper stirrup 2 from which two upper arms 4 and 5 project. Their attachment means which are formed as a bore is designated with the reference numeral 23. The reinforcing fins which are provided on the upper arms 4 and 5 for increasing their stiffness are designated with the reference numeral 25. At the edges of the bore 23, there are provided supports 24. This constructive measure ensures providing on the outer side of the base section 3 in the region of the bore 23 of bearing surface, despite the presence of the reinforcing fin 25.

FIG. 6 shows a pipe clamp 1 according to the present invention which is used in earthquake-susceptible areas. To this end, a thread bolt extends through openings 22 formed in the upper arms 4 and 5. The threaded bolt B extends in space defined by the U-shaped cross-section of the stiffening member 19. Thereby, no loss of cross-section of the pipe clamp 1 takes place despite the arrangement of the threaded bolt B. With a nut, a bracing element A is secured on the thread bolt B. The bracing element A may be connected with another constructional element. FIG. 6 also shows a thread rod G which extends through the base section 3 and which is fixed by a tightening nut S. On the outer side of the base section 3, a counter nut can be provided. The threaded rod G provides for suspension of the pipe clamp 1, for example, from a ceiling. The three space between the base section 3 and the stiffening member 19 provides an adequate space for vertical adjustment of the suspended pipe 1.

Though the present invention has been shown and described with reference to preferred embodiments, such are merely illustrative of the present invention and are not to be construed as to be limited to the disclosed embodiments and/or details thereof, and the present invention includes all further modifications, variations and/or ultimate embodiments within the spirit and scope of the present invention as defined by the appended claims.

What is claimed is:

1. A pipe clamp, comprising a substantially U-shaped upper stirrup (2) having a base section (3) provided with attachment means (23) for receiving a threaded rod (G), two substantially linear upper arms (4, 5) projecting from the base section (3) and having end portions thereof extending substantially parallel to each other, and a stiffening member (19) extending from one upper arm (4) to another upper arm (5) and spanning a free-cross-section of the pipe clamp (1); a substantially U-shaped lower stirrup (6) having a substantially circular shape, and two lower arms (8, 9); means for realeasably connecting the upper and lower stirrups (2, 6) and including articulated connection means (10) for pivotally connecting one of the upper arms (5) of the upper stirrup (2) with one of the lower arm (9) of the lower stirrup (6), and locking means (13) located opposite the articulated connection means (10) for realeasably connecting another of the upper arms (4) of the upper stirrup (2) with another of the lower arms (8) of the lower stirrup (6); and means for permanently connecting the stiffening member (19) with both upper arms (4, 5) of the upper stirrup (2).

2. A pipe clamp according to claim 1, wherein the upper and lower stirrups (2,6) are provided, at least along a portion of an extent thereof with reinforcing fins (25,26).

3. A pipe clamp according to claim 1, wherein the articulated connection means comprises means for formlockingly connecting the stiffening member (19) with the upper arms, the formlockingly connecting means including openings (21) formed in the upper arms (4,5) and tongues (20) provided at free ends of the stiffening member (19) with the upper arms, the formlockingly connecting means including openings (21) formed in the upper arms (4,5) and tongues (20) provided at free ends of the stiffening member (19) which extend through respective openings (21) and are bent upward.

4. A pipe clamp according to claim 3, wherein the upper arms (4,5) of the upper stirrup (2) have each a through-opening (22).

5. A pipe clamp according to claim 1, wherein an outer side of the base section (3) remote from the free cross-section of the clamp has, in a region of the attachment means 9 (23), a bearing surface.

6. A pipe clamp according to claim 5, wherein the bearing surface is formed by a wall of a bore.

7. A pipe clamp, comprising a substantially U-shaped upper stirrup (2) having a base section (3) provided with attachment means (23) for receiving a threaded rod (G), two substantially linear upper arms (4, 5) projecting from the base section (3) and having end portions thereof extending substantially parallel to each other, and a stiffening member (19) extending from one upper arm (4) to another upper arm (5) and spanning a free-cross-section of the pipe clamp (1); a substantially U-shaped lower stirrup (6) having a substantially circular shape, and two lower arms (8, 9); means for realeasably connecting the upper and lower stirrups (2, 6) and including articulated connection means (10) for pivotally connecting one of the upper arms (5) of the upper stirrup (2) with one of the lower arm (9) of the lower stirrup (6), and locking means (13) located opposite the articulated connection means (10) for realeasably connecting another of the upper arms (4) of the upper stirrup (2) with another of the lower arms (8) of the lower stirrup (6); wherein the locking means (13) comprises a hook-shaped projection (18) provided on one of the another (4) of the upper arms of the upper stirrup (2) and another (8) of the lower arms of the lower stirrup (6), a through-opening (15) provided in a radially projecting flange (14) of another one of the another (8) of the lower arms of the lower stirrup (6) and the another of the upper arms of upper stirrup (2), a pivotable out locking plate (16) for covering the through-opening (15) and which is provided at a side of the flange (14) remote from the hook-shaped projection (18) and which engages the hook-shaped projection (18) from beneath in a locking position, and a return spring (17) for biasing the locking plate (16) into a position in which the locking plate (16) covers the through-opening (15).

8. A pipe clamp according to claim 7, wherein the return spring (17) is formed of metal.

9. A pipe clamp according to claim 8, wherein the return spring (17) is formed of stainless steel.

10. A pipe clamp, comprising a substantially U-shaped upper stirrup (2) having a base section (3) provided with attachment means (23) for receiving a threaded rod (G), two substantially linear upper arms (4, 5) projecting from the base section (3) and having end portions thereof extending substantially parallel to each other, and a stiffening member (19) extending from one upper arm (4) to another upper arm (5) and spanning a free-cross-section of the pipe clamp (1); a substantially U-shaped lower stirrup (6) having a substantially circular shape, and two lower arms (8, 9); means for realeasably connecting the upper and lower stirrups (2, 6) and including articulated connection means (10) for pivotally connecting one of the upper arms (5) of the upper stirrup (2) with one of the lower arm (9) of the lower stirrup (6), and locking means (13) located opposite the articulated connection means (10) for realeasably connecting another of the upper arms (4) of the upper stirrup (2) with another of the lower arms (8) of the lower stirrup (6); wherein the articulated connection means (10) comprises a lock hole (11) formed in one of the one upper arm (5) of the upper stirrup (2) and the one of the lower arms of the lower stirrup (6), and a locking tongue (12) provided on another one of the one of the upper arms of the upper stirrup (2) and the one (9) of the lower arms of the lower stirrup (6).

\* \* \* \* \*